Aug. 23, 1955 T. B. TINKER 2,716,013
FLEXIBLE VALVE STRUCTURE
Original Filed Nov. 24, 1948
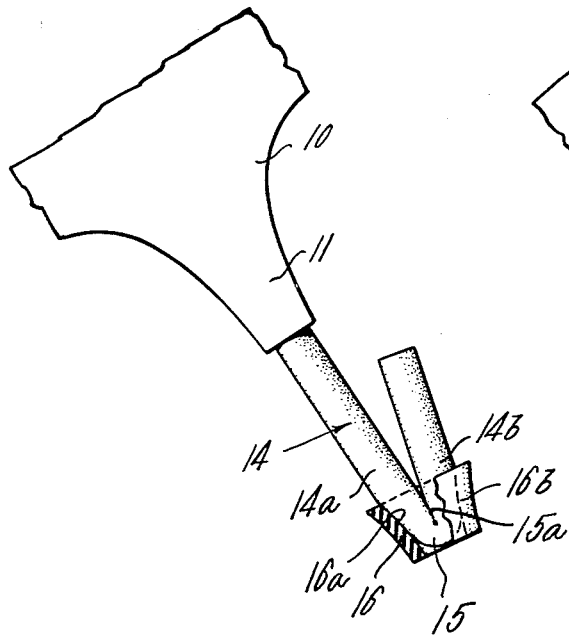
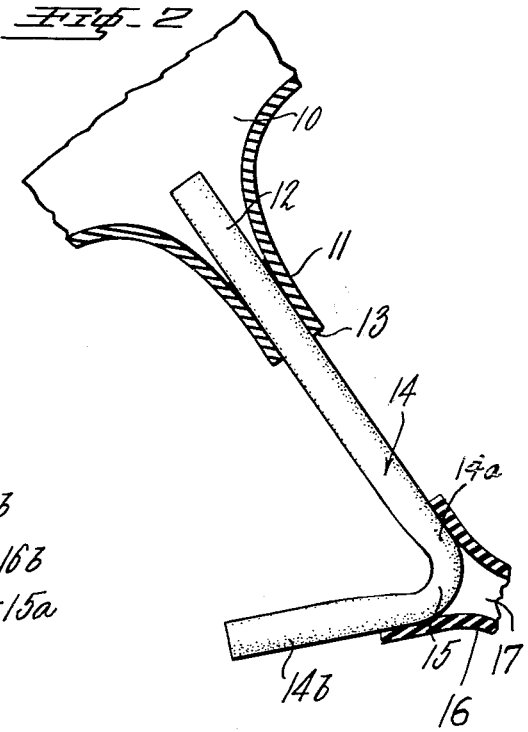
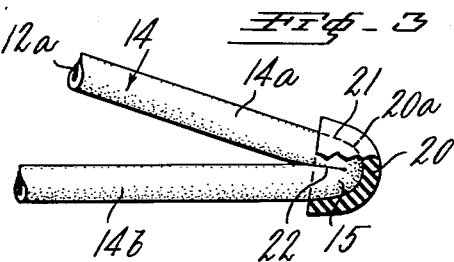
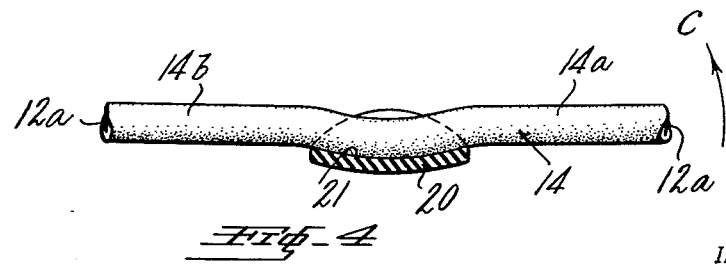
INVENTOR.
THEODORE B. TINKER

2,716,013

FLEXIBLE VALVE STRUCTURE

Theodore B. Tinker, New York, N. Y.

Original application November 24, 1948, Serial No. 61,828. Divided and this application May 27, 1950, Serial No. 164,819

1 Claim. (Cl. 251—4)

The present invention relates generally to valve structures and, in particular, to non-metallic valve structures for use in connection with inflatable objects or devices, such as inflatable rubber balls, bladders of footballs, inflatable chambers of breast protectors and like receptacles.

This application is a division of co-pending application Ser. No. 61,828, filed November 24, 1948, in the names of Arnold G. Leo and Theodore B. Tinker, which has now matured into U. S. Patent No. 2,516,129.

It is one of the primary objects of this invention to provide means affording the passage of air through a conduit in one position of the latter and obstructing said conduit in another position, whereby the conduit is temporarily compressed or deformed to prevent escape of air from within an inflatable chamber therewithout.

It is another object of the present invention to provide means facilitating closing of the inflatable air chamber of an article substantially instantaneously and automatically and without the employment of any metallic valve parts.

Still another object of the present invention is to provide means permitting the use of valve parts made of rubber or similar plastic material for opening and contracting or closing the conduit for the passage of air or similar fluid, which valve parts are preferably made integral with the rubber conduit.

With the above and other objects in view, the invention will be hereinafter more particularly described and the combination and arrangement of parts will be shown in the accompanying drawing and pointed out in the claim which forms part of the specification.

In the drawing:

Fig. 1 is a fragmentary view, partly in section, of a valve made according to the invention and associated with a conduit, said valve means being shown in position for retaining said conduit in closed position.

Fig. 2 is a sectional view similar to that of Fig. 1 with the valve means shown in position to permit air passage through said conduit.

Fig. 3 is a fragmentary view, partly in section, of a conduit with valve means in modified form and maintaining said conduit in closed position.

Fig. 4 shows the conduit and valve means of Fig. 3 in open position.

Referring now more particularly to the drawing, there is shown in Fig. 1 an air chamber 10 forming part of a compressible ball or inner tube made from rubber or any other suitable plastic material. This chamber 10 has a reduced hollow portion 11 in which is inserted a conduit 12 extending through the opening 13 passing through the reduced portion 11 and projecting beyond opening 13 to form a knee-shaped extension 14.

Adjacent the bend or bight portion 15 and partially affixed to the outer surfaces of legs 14a and 14b of extension 14 is a rubber ring member 16 which surrounds extension 14 at the bight portion 15 and is attached to a portion of leg 14a at 16a and to leg 14b at 16b for a purpose hereinafter described.

If it is desired to inflate tube or air chamber 10, leg 14b is gripped by the hand of the operator and pulled to such an extent that it assumes a position as seen in Fig. 2, whereby rubber ring element 16 is deformed as leg portions 14a and 14b are separated, tending to straighten conduit 14. Thus air may be forced into chamber 10 through conduit 12.

As soon as chamber 10 is sufficiently inflated all that is to be done is to release leg or end portion 14b. The resilience of ring element 16 will then press legs 14a and 14b inwardly to assume a position as seen in Fig. 1.

It may be mentioned that the inner surface of rubber ring 16 is substantially, although only partially, fixed to conduit extension 14 to permit the stretching of said ring 16 upon straightening of said conduit.

Since no metallic parts are used for this valve construction it goes without saying that the same can be employed in many instances where metal parts were heretofore used to open and close a valve and where these metal parts were, however, undesirable since they exerted pressure and caused friction which led to early destruction of the valve and rubber conduit means.

Figs. 3 and 4 show a somewhat modified form of the valve structure in which instead of a preformed rubber ring, as seen in Figs. 1 and 2, a preformed rubber cap 20 is employed which is vulcanized or otherwise bonded solely to the outer wall surface of conduit extension 14 at 21. The bend 15, in this particular instance, is surrounded by the inner wall 20a of rubber cap 20 which is dimensioned to extend over the major portion of bend 15, whereby legs 14a and 14b of conduit extension 14 will be compressed together at 22 so as to obstruct or deform the passageway 12a of conduit extension 14. This deformation or obstruction at bight portion 22 corresponds to the sharp, angular bend at 15a in Fig. 1.

If it is desired to introduce air under pressure through leg 14b to the conduit and air chamber 10 it will be necessary to stretch by hand leg 14b with respect to leg 14a of conduit extension 14 whereby the latter will assume a position as seen in Fig. 4. In this position the rubber cap 20 will be somewhat stretched against its force of contraction, while the passageway 12a remains open to permit introduction of air therethrough.

As soon as it is desired to close said passageway the valve cap 20 is allowed to flex back and to thereby permit approachment of legs 14a and 14b in accordance with arrow C, whereby legs 14a and 14b assume a position as seen in Fig. 3 with the cap 20 again encircling the the bend 15 of the rubber extension of conduit 12.

From the above disclosure it will be readily recognized that the flexible and contractible element 16 or 20, be it in the form of a rubber ring or rubber cap, produces a sharp bend in the conduit or extension 14 at 15a or 22, whereby the air filling the inflatable chamber 10 will be effectively prevented from escaping from said chamber.

The contractible ring element 16 is dimensioned to be preferably of a diameter smaller than that of said conduit and is associated with the end piece of the conduit in any suitable manner, said element normally constricting the passageway through said conduit in one position, said conduit when stretched, causing change of position of said element to another position in which fluid may be introduced through the passageway of said conduit into the inflatable article.

Although the element 16 is shown to assume the form of a ring of conical formation tapering toward the bend 15, it is well understood that the contractible element according to the invention is preferably of such configuration that it ensures air or fluid tightness in closed position of the valve structure. It may be mentioned that the valve structure 14—15—16 may be folded over the reduced portion 11, if desired, without disturbing the position of element 16 relatively to the U-shaped bend of the conduit and thus takes up a minimum of space.

Although the invention has been described with reference to certain specific embodiments thereof, it is to be distinctly understood that various modifications and adaptations of the arrangements herein disclosed may be made as may readily occur to persons skilled in the art without constituting a departure from the spirit and scope of the invention as defined in the objects and in the appended claim.

Having thus described the invention, what is claimed as new and desired to be secured by Letters Patent, is:

A valve structure comprising a tubular conduit of elastic and pliable material for connection with a chamber to fill same with a fluid and provided with an end portion adapted to be normally folded upon itself to thereby provide a bight portion intermediate said end portion and the remainder of said conduit, said bight portion having an outer surface, and an element of elastic material preformed and dimensioned to inherently contract and compress said conduit material at said bight portion, said element having an inner surface bonded solely to said outer surface of said bight portion, whereby said conduit is normally closed to passage of fluid at said bight portion and is open for such passage of fluid by substantially separating the folded end portion of said conduit from said remainder of the latter against the force of contraction of said element.

References Cited in the file of this patent

UNITED STATES PATENTS

| | | |
|---|---|---|
| 815,192 | Mercer | Mar. 13, 1906 |
| 1,037,406 | Albers | Sept. 3, 1912 |
| 1,714,741 | Urquhart | May 28, 1929 |
| 2,002,835 | Rose | May 28, 1935 |
| 2,323,629 | Spanel | July 6, 1943 |
| 2,444,449 | Kearny | July 6, 1948 |